United States Patent
Guo et al.

(10) Patent No.: US 8,423,761 B2
(45) Date of Patent: Apr. 16, 2013

(54) METHOD AND DEVICE FOR ENABLING A TRUST RELATIONSHIP USING AN EXPIRED PUBLIC KEY INFRASTRUCTURE (PKI) CERTIFICATE

(75) Inventors: Liang Guo, Brighton, MA (US); Whay Chiou Lee, Cambridge, MA (US); Anthony R. Metke, Naperville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 871 days.

(21) Appl. No.: 12/262,786

(22) Filed: Oct. 31, 2008

(65) Prior Publication Data
US 2010/0115267 A1 May 6, 2010

(51) Int. Cl.
G06F 21/00 (2006.01)

(52) U.S. Cl.
USPC ............................................. 713/156; 726/26

(58) Field of Classification Search .................. 713/156; 726/26
See application file for complete search history.

(56) References Cited

U.S. PATENT DOCUMENTS

| | | | |
|---|---|---|---|
| 2002/0194010 A1* | 12/2002 | Bergler et al. ..................... 705/1 |
| 2003/0018890 A1* | 1/2003 | Hale et al. ..................... 713/156 |
| 2004/0250071 A1* | 12/2004 | Higashiura et al. ........... 713/170 |
| 2004/0268142 A1 | 12/2004 | Karjala et al. |
| 2005/0114653 A1* | 5/2005 | Sudia ........................... 713/158 |
| 2005/0125656 A1 | 6/2005 | Mallal et al. |
| 2006/0107039 A1 | 5/2006 | Sugiura et al. |
| 2007/0174898 A1 | 7/2007 | Maes et al. |
| 2007/0234053 A1 | 10/2007 | Kudo |
| 2007/0245401 A1* | 10/2007 | Brabson et al. .................... 726/1 |
| 2008/0229426 A1* | 9/2008 | Saitoh ............................. 726/26 |

FOREIGN PATENT DOCUMENTS

| | | | |
|---|---|---|---|
| JP | 2003134109 A | 5/2003 |
| KR | 20040001814 A | 1/2004 |

OTHER PUBLICATIONS

Qingwei Zhang, Mohammed Almulla, Yonglin Ren, and Azzedine Boukerche Computers and Communications (ISCC), 2012 IEEE Symposium on Topic(s): Communication, Networking & Broadcasting ; Components, Circuits, Devices & Systems ; Publication Year: 2012 , pp. 000862-000867.*
Internet X.509 Public Key Infrastructure Certificate Policy and Certification Practices Framework 2003 RFC Editor , United States.*
Morogan et al., "Certificate Management in Ad Hoc Networks," Proc IEEE SAINT'03 Workshops, Jan. 2003, pp. 337-341.

(Continued)

*Primary Examiner* — Carl Colin
*Assistant Examiner* — Ali Shayanfar
(74) *Attorney, Agent, or Firm* — Steven A. May

(57) ABSTRACT

A method and device are useful for enabling a trust relationship using an expired public key infrastructure (PKI) certificate. The method includes determining at a relying party a maximum permissible grace period during which the PKI certificate can be conditionally granted a valid status (step 905). Next, at the relying party an uncertainty interval is determined, during which the relying party is unable to detect a revocation of the PKI certificate (step 910). A certificate grace period is then determined at the relying party from a function of the maximum permissible grace period, the uncertainty interval and at least one attribute defined in the PKI certificate (step 915). Using the PKI certificate, a trust relationship is then enabled between the relying party and a certificate holder of the PKI certificate, after determining the grace period and before an expiration of the grace period (step 920).

19 Claims, 8 Drawing Sheets

OTHER PUBLICATIONS

X. Ao et al., "Formal Treatment of Certificate Revocation Under Communal Access Control," Proc. of the 22nd IEEE Symposium on Security and Privacy, May 2001, pp. 116-129.

Santuu Toivonen et al., "The Impact of Context on the Trustworthiness of Communication: An Ontological Approach," 3rd International Semantic Web Conference, Nov. 2004, 10 pages.

R. Housley et al., "Internet X.509 Public Key Infrastructure: Certificate and Certificate Revocation List (CRL) Profile," Internet RFC 3280, Apr. 2002, 2 pages.

M. Myers et al., "X.509 Internet Public Key Infrastructure: Online Certificate Status Protocol—OCSP," Internet RFC 2560, Jun. 1999, 21 pages.

Yki Kortesniemi, "Validity Management in SPKI," (powerpoint presentation) http://www.cs.dartmouth.edu/~pki02/Kortesniemi/slides.ppt, Apr. 24, 2002, 19 slides.

Sarbari Gupta, "Concept of Operations for the Department of Defense: Online Certitcate Status Protocol Service," (Powerpoint Presentation) Electrosoft Service Inc., Nov. 12, 2002, 32 slides.

Related U.S. Appl. No. 12/262,761, filed Oct. 31, 2008.

Final Office Action mailed on Dec. 12, 2011 in related U.S. Appl. No. 12/262,761, Liang Guo, filed Oct. 31, 2008.

Non Final Office Action mailed on Apr. 28, 2011 in related U.S. Appl. No. 12/262,761, Liang Guo, filed Oct. 31, 2008.

International Search Report and Written Opinion for related International Application No. PCT/US2009/058149 mailed on May 3, 2010.

International Search Report and Written Opinion for related International Application No. PCT/US2009/058147 mailed on Apr. 23, 2010.

English language Abstract of JP Patent Publication No. JP2003134109A, European Patent Office, espacenet database—Worldwide (2003).

English language Abstract of KR Patent Publication No. KR20040001814A, European Patent Office, espacenet database—Worldwide (2003).

International Preliminary Report on Patentability dated May 3, 2011 for related Application No. PCT/US2009/058149.

International Preliminary Report on Patentability dated May 3, 2011 for Application No. PCT/US2009/058147.

Supplementary European Search Report for related European Patent Application No. 09829518 mailed on Feb. 15, 2012.

* cited by examiner

METHOD AND DEVICE FOR ENABLING A TRUST RELATIONSHIP USING AN EXPIRED PUBLIC KEY INFRASTRUCTURE (PKI) CERTIFICATE

CROSS-REFERENCE TO RELATED APPLICATION

The present application is related to the following U.S. application commonly owned with this application by Motorola, Inc.: U.S. patent application Ser. No. 12/262,761 of Liang Guo entitled "Method And Device For Enabling A Trust Relationship Using An Unexpired Public Key Infrastructure (PKI) Certificate", filed concurrently herewith, the entire contents of which being incorporated herein by reference.

FIELD OF THE DISCLOSURE

The present invention relates generally to security and trust management in communication networks, and in particular to enabling a trust relationship using an expired public key infrastructure (PKI) certificate during a determined certificate grace period.

BACKGROUND

Security in a communication network can be enhanced through use of a public key infrastructure (PKI). A PKI provides mechanisms to bind public keys to entities, enable other entities to verify public key bindings, and provide the services needed for ongoing management of keys in a distributed system. By supporting public key based authentication, a PKI also improves confidentiality, integrity and authentication of communications. A primary function of a PKI is to provide a relying party assurance of the validity of certificates possessed by a certificate holder. The certificates are issued and signed by a third party, called a certification authority (CA), which is trusted by both the certificate holder and the relying party. Overall network security is thus often dependent on the validity, and hence trustworthiness, of individual certificates.

As all public-key schemes are at least to some degree susceptible to security attacks, such as a brute force key search attack, various PKI security precautions are generally employed. For example, each public key certificate generally has a validity period, beyond which the certificate becomes invalid (equivalently, the certificate is said to have expired). Also, a certificate may be proactively revoked by the CA that issued it, or by a certificate holder if any compromise of key security is detected.

A CA is generally responsible for advertising certificate status information of active certificates to all relying parties, either proactively through publishing certificate revocation lists (CRLs), or reactively by responding to on-demand requests (e.g., through a validation authority (VA) using an Online Certificate Status Protocol (OCSP)). With proactive publication of a CRL, each period between successive advertisements is a vulnerable interval during which revocation of a certificate may be undetectable by a relying party. With on-demand requests, certificate status update delays can be increased by the unavailability of a connection to an OCSP server, or by the inability of an OCSP server to obtain a certificate revocation status from a CA.

A certificate holder conventionally must maintain a valid certificate issued by a CA in order to continue making trustworthy transactions with relying parties that trust the CA. When a certificate approaches expiration, the certificate holder may request the CA to renew the certificate for an extended validity period, but without changing a distinguished name, attributes, or a key associated with the certificate. A certificate holder of a revoked certificate may obtain a new certificate from the CA that issued the original certificate through a certificate update process, by which the CA grants a new certificate with the same distinguished name, but with one or more updated or new attributes, a new key, a new serial number, and possibly a new validity period. Certificate renewals and certificate updates require existence of a secure communication channel between a CA and a certificate holder. Further, confirmation of certificate renewals and certificate updates may require existence of a secure communication channel between a CA and a relying party.

However, even when a secure communication channel between a CA and a certificate holder is unavailable, and/or when a secure communication channel between a CA and a relying party is unavailable, use of an unexpired PKI certificate still may be required.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
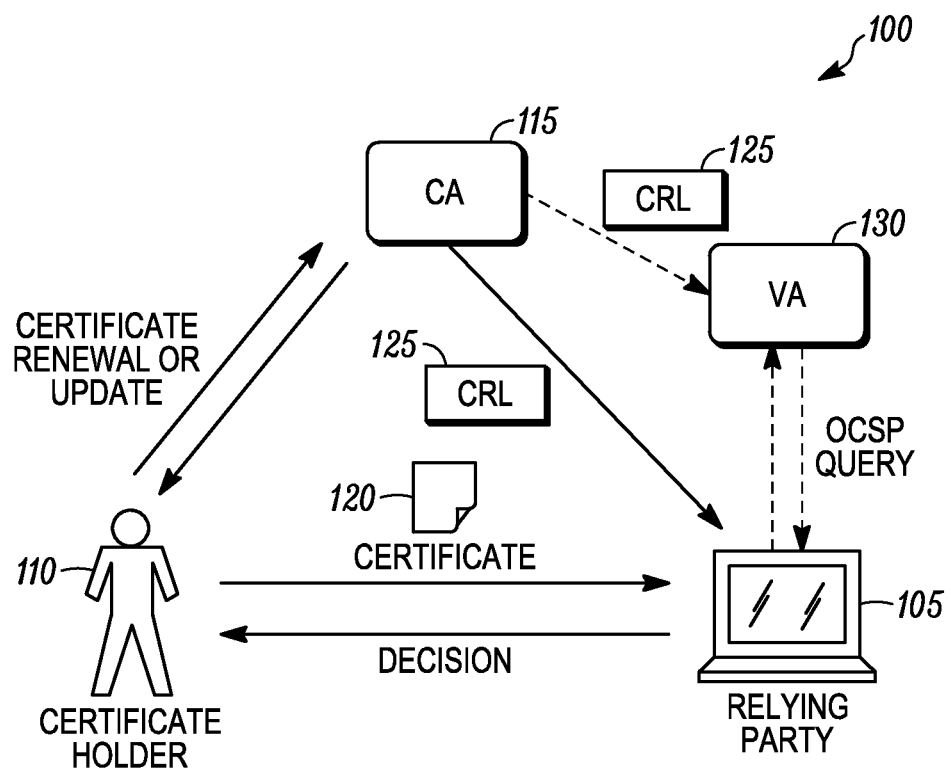
FIG. 1 is a diagram illustrating a communication network that includes open communication channels between a relying party, a certificate holder, a validation authority (VA), and a certification authority (CA).

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables a trust relationship using an expired public key infrastructure (PKI) certificate. The method includes determining at a relying party a maximum permissible grace period during which the PKI certificate can be conditionally granted a valid status. Next, at the relying party an uncertainty interval is determined, during which the relying party is unable to detect a revocation of the PKI certificate. A certificate grace period is then determined at the relying party from a function of the maximum permissible grace period, the uncertainty interval and at least one attribute defined in the PKI certificate. Using the PKI certificate, a trust relationship is then enabled between the relying party and a certificate holder of the PKI certificate, after determining the grace period and before an expiration of the grace period.

Embodiments of the present invention thus enable a relying party to continue to use an expired PKI certificate when connectivity to a corresponding certificate authority (CA) is unavailable. The certificate grace period is a length of time an expired certificate can be conditionally regarded as valid by a relying party. As described in detail below, the certificate grace period can be determined intelligently based on various attributes associated with the certificate holder. Thus, rather than precluding all use of certificates when connectivity to a corresponding CA is lost, or simply establishing an arbitrary grace period during which non-updated or expired certificates can be used, embodiments of the present invention enable a compromise that can improve communication network effectiveness while reducing communication network security risks.

Referring to FIG. 1, a diagram illustrates a communication network 100 that includes open communication channels between a relying party 105, a certificate holder 110, a validation authority (VA) 130, and a certification authority (CA) 115. The certificate holder 110 is responsible for maintaining validity of a certificate 120 through certificate renewal with the CA 115, or update operations with the CA 115 or the VA 130. The relying party 105 is assumed to possess a latest valid public key of the CA 115 obtained through a secure channel, and hence is able to validate any certificate issued by the CA 115 and signed using a corresponding private key of the CA 115. Also, the relying party 105 periodically receives certificate status update information from the CA 115. For example, such status update information may be received by the relying party 105 directly from the CA 115 in the form of a certificate revocation list (CRL) 125. Alternatively, as shown by the dashed lines in FIG. 1, the relying party 105 may obtain the status update information indirectly by sending an online certificate status protocol (OCSP) query to a validation authority (VA) 130, where the VA 130 receives the CRL 125 directly from the CA 115.

When the certificate holder 110 attempts to gain access to resources of the relying party 105, the certificate holder 110 presents its most up-to-date certificate 120 signed by the CA 115, which is trusted by both the certificate holder 110 and the relying party 105. The relying party 105 then verifies the validity of a signature of the CA 115, and checks if the certificate 120 is identified in the CRL 125 received most recently from the CA 115. If the certificate 120 carries a valid signature and is not included in the CRL 125 (i.e., it has not been revoked), the relying party 105 may accept the certificate 120 and grant resource access to the certificate holder 110. Otherwise, the request for access to resources of the relying party 105 is denied.

However, establishing trust according to the conventional PKI communications illustrated in FIG. 1 is not possible if communication links with the CA 115 are unavailable. For example, consider that the communication network 100 comprises an ad hoc wireless communication network operated by various emergency response units at an incident scene, such as at a site destroyed by a hurricane or a terrorist attack. In such an environment, local back-end communication infrastructure may have been destroyed or be otherwise inoperable. Thus the certificate holder 110 and/or the relying party 105, who may be members of different response units that need to communicate with each other, may not have connectivity with the CA 115.

According to embodiments of the present invention, a relying party can continue to use an unexpired PKI certificate even when connectivity to a corresponding certificate authority (CA) is unavailable. However, use of PKI certificates is not merely extended arbitrarily, which could lead to breaches in network security.

Communication networks that implement embodiments of the present invention can comprise various types of wired or wireless network architectures including a mesh enabled architecture (MEA) network, or an Institute of Electrical and Electronics Engineers (IEEE) 802.11 network (i.e. 802.11a, 802.11b, 802.11g, 802.11n). (Note: for any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access).

Embodiments of the present invention enable a holder of a certificate to negotiate with a relying party for extension of a temporarily unverifiable trust relationship subject, such as under predetermined conditions on access or task authorization. For example, consider that a trust relationship is temporarily unverifiable due to delay in a certificate status update by a certification authority (CA) or a validation authority (VA), and/or a delay in a certificate renewal by a CA. Such delay can be caused by loss of connectivity to the CA and/or VA, for example.

The collection of PKI entities that need to be contacted for timely trust management, such as a CA or a VA, are referred to herein as a PKI Authority (PA). Further, if an entity is able to communicate with a PA, then it is referred to herein as being in an "on-line" state; if not, it is referred to herein as being in an "off-line" state. If the certificate holder is off-line, it will not be able to renew or update its certificate timely to avoid validation failure. If the relying party is off-line, it may not have an up-to-date CRL to determine if the certificate shown by the certificate holder has been revoked or not. A certificate that fails validation is normally revoked, unless there is successful conditional validation as enabled by the present invention. A certificate is valid, and hence trustworthy, from the time it is issued to the time it expires or is revoked, at which time the certificate may be renewed (in the case of expiration) or updated (in the case of revocation).

Figure 2:
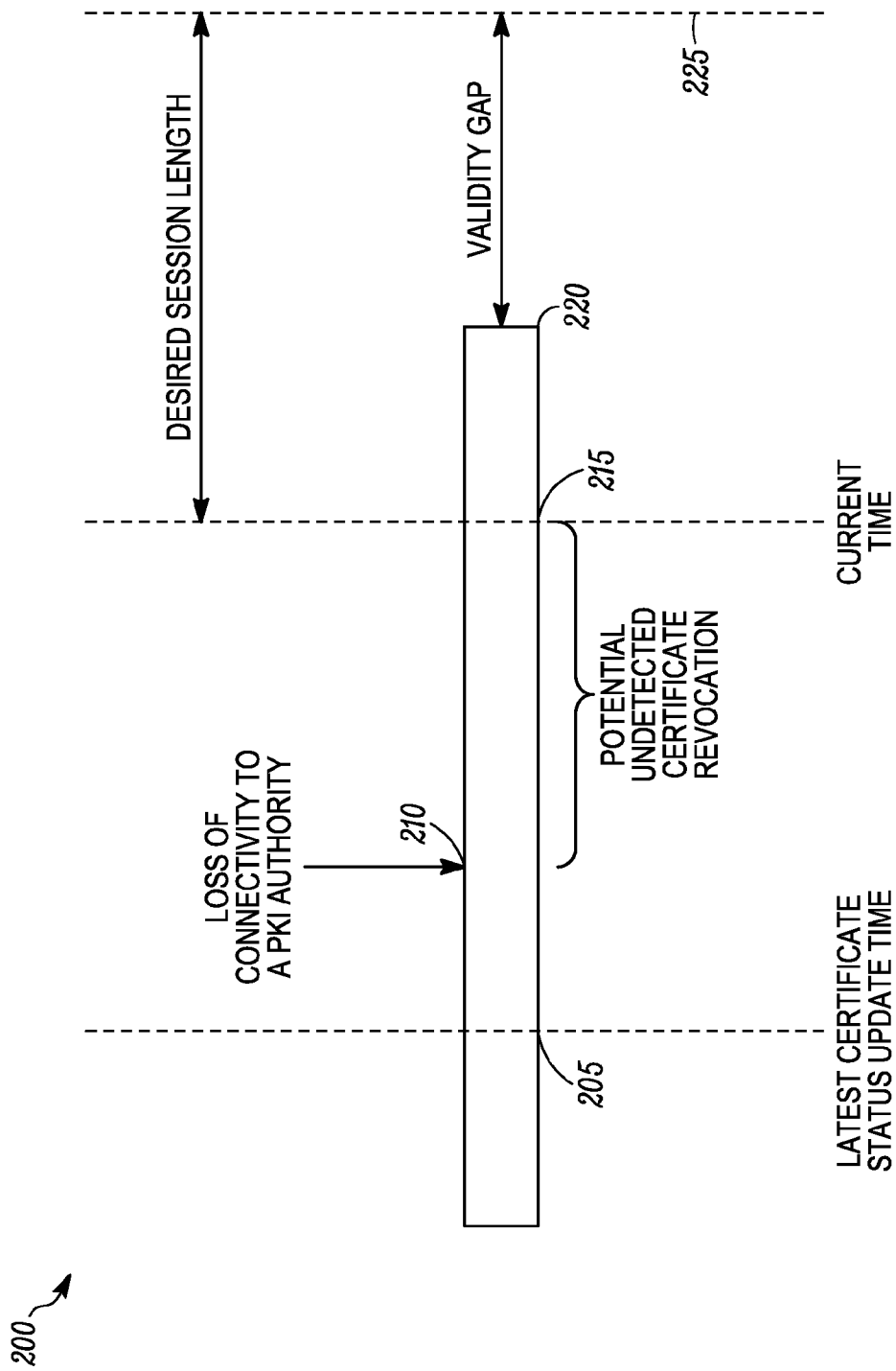
FIG. 2 is a certificate timeline illustrating a need for a tolerable certificate status age (TCSA) and a certificate grace period of a PKI certificate, according to some embodiments.

Referring to FIG. 2, a certificate timeline 200 illustrates a need for a tolerable certificate status age (TCSA) and a certificate grace period (CGP) of a PKI certificate, according to some embodiments of the present invention. A TCSA may be needed before a certificate expires, whereas a CGP may be needed after a certificate expires. Consider that time progresses in the timeline 200 from left to right, and at a time 205 a certificate status update (provided, for example, through a CRL publication or an on-demand request) is received by a relying party, then at a time 210 the relying party loses connectivity with a PA, and a time 215 represents a current time. The period between the time 205 and the time 215 is a period during which the relying party did not receive a report of a revocation of the certificate. Between the time 205 and the time 210, the relying party may assume that the certificate remains valid since a report of a revocation of the certificate could have been received by the relying party. Between the time 210 and the time 215, the relying party could not receive any report from the PA, and hence any certification revocation would have been undetected by the relying party. The time 210 may not be determinable by the relying party at the current time 215. Thus, the time 205 defines the beginning of a TCSA according to some embodiments of the present invention. Further consider that the certificate is set to expire at a time 220 and that the relying party requires use of the certificate during a desired session that willing to conditionally regard the certificate as valid (i.e., willing to accept the recently expired certificate for enabling a trust relationship).

Figure 3:
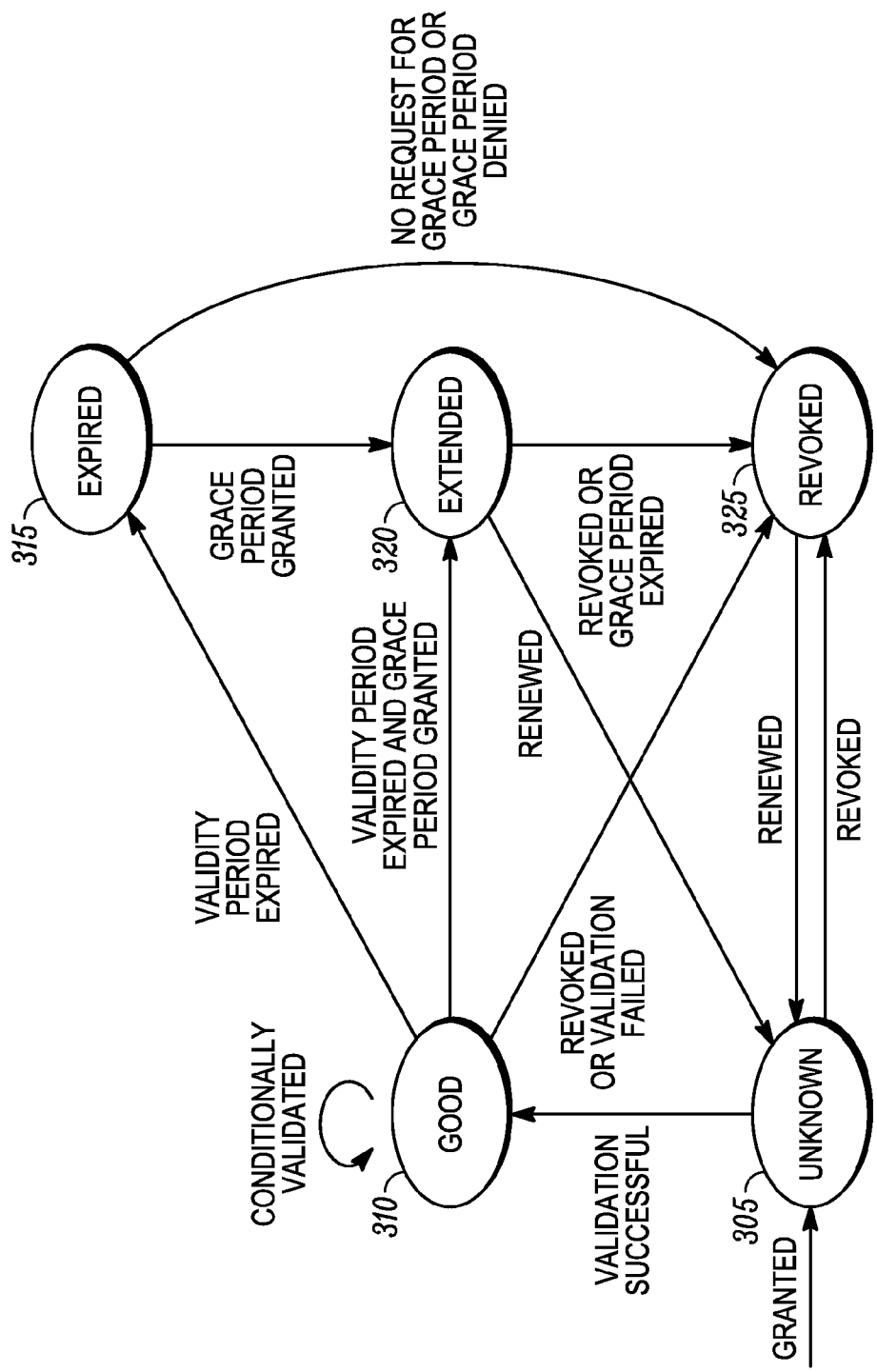
FIG. 3 is a certificate state diagram illustrating five possible states of a certificate, according to some embodiments.

Referring to FIG. 3, a certificate state diagram illustrates five possible states of a certificate, according to some embodiments of the present invention. An unknown state 305 applies after a certificate is granted and before it is validated, renewed or revoked. A good state 310 applies after a certificate is validated and before it expires, fails to be validated as needed, or is revoked. A certificate in the good state 310 may remain in the good state 310 if it can be conditionally validated. An expired state 315 applies after expiration of a validity period if a grace period has not been granted. An extended state 320 applies if a validity period has expired but a grace period has been granted and has not expired, and the certificate has not been renewed. Finally, a revoked status 325 applies if a certificate has expired or been revoked, or an applicable grace period has expired or been denied, and the certificate has not been renewed. The expired state 315 and the extended state 320 add to three certificate states of good, revoked and unknown that are defined according to the prior art in the online certificate status protocol (OCSP), as described in M. Myers et al., "X.509 Internet Public Key Infrastructure: Online Certificate Status Protocol—OCSP", Internet RFC 2560, June 1999.

According to some embodiments of the present invention, a certificate status history associated with a certificate can be used to define a TCSA and a grace period. For example, each certificate issued by a CA to a certificate holder may include, in addition to the identity and public key of the certificate holder, the information included in Table 1 below:

TABLE 1

| Variable | Definition |
| --- | --- |
| T_BeginSeniority | Earliest time from which the certificate holder's certificate (or authorization status) has not been involuntarily revoked. |
| T_BeginValid | Time when the certificate holder's oldest certificate was renewed after the most recent validity gap. |
| T_LastRenew | Time when the certificate holder's most recent certificate was renewed. |
| T_LastExpire | Expiration time of the certificate holder's most recently renewed certificate. |
| MaxOutdate | Maximum permissible length of time an unexpired certificate can be conditionally trusted in spite of a lack of timely certificate status update. This variable is set by policy and bounds the calculated tolerable certificate status age. This parameter can be used for any certificate holder. |
| MaxGracePeriod | Maximum permissible length of time that a certificate may be conditionally granted valid status even though it has expired. This variable is set by policy and bounds the calculated certificate grace period that can be extended to any certificate holder. |
| MaxSessionLength | Maximum permissible length of a session starting from the current time. | expires at a time 225. The time 220 therefore defines a latest ending time of the TCSA to allow conditional validation of the unverifiable certificate. Further, the ending time of the TCSA is bounded from below by the time 215, which is the current time. Subject to the above conditions, the relying party determines an ending time of the TCSA based on local policy. Further, the period between the time 220 and the time 225 represents a grace period that is required to cover a "validity gap" between the expiration of the certificate and the end of the desired session, during which the relying party is Some organizations or network management systems may want to impose an upper-bound on the time elapsed since a relying party most recently obtained a certificate status update and during which the relying party can authenticate a certificate holder. This upper-bound ensures that a certificate status update is acceptably fresh to be considered reliable. MaxOutdate is a variable determined by local policy to achieve this.

In normal circumstances, a CA may stop monitoring a certificate after the certificate has expired. However, because a relying party may be able to grant a certificate grace period to a certificate holder, there may be a need to continue monitoring the certificate beyond its expiration time for possible revocation. In accordance with some embodiments of the present invention, the CA determines a maximum certificate grace period for each certificate the CA issues. When a certificate expires, the CA will continue to monitor the certificate over this length of time for possible revocation. Also, a certificate grace period granted by a relying party generally will not exceed the maximum certificate grace period. This maximum certificate grace period is included in the certificate for synchronization with the relying party.

When a holder of an expired certificate presents the certificate to a relying party for authentication service, with an implicit request for a certificate grace period, the certificate holder may additionally indicate a session length over which the certificate grace period would desirably cover. Some organizations may want to impose an upper-bound on session length that may be accommodated by a relying party for a certificate holder with an expired certificate. This upper-bound essentially limits an extent of security compromise due to potential mistakes in granting a certificate grace period to an undeserving certificate holder. MaxSessionLength is a variable determined by local policy to achieve this.

By time-stamping each certificate revocation list (CRL) update received from a CA, a relying party knows or can derive at least the following variables included in Table 2.

TABLE 2

| Variable | Definition |
| --- | --- |
| T_LastCRL | Time the last CRL update was received. |
| T_BeginUncertainty | max(T_LastRenew, T_LastCRL). |
| T_EndUncertainty | min(T_Current + MaxSessionLength, T_LastExpire + MaxGracePeriod). |

T_Current denotes the current time at the moment when a certificate holder is attempting to authenticate with a relying party. The interval from T_BeginUncertainty to T_EndUncertainty represents an interval in which the relying party is unable to detect a revocation of the certificate, if any. It is assumed that the relying party has a valid public key of the CA and any necessary certificate chains, and hence is able to validate all the information contained in any certificate signed with a corresponding private key of the CA. When a relying party is presented with an unexpired certificate that the relying party cannot verify timely, the relying party will first determine an appropriate value for a tolerable certificate status age (TCSA) based on predetermined policy.

According to some embodiments of the present invention, intervals are defined as provided in Table 3 below.

TABLE 3

| Interval | Notation | Definition |
| --- | --- | --- |
| Uncertainty Interval | U | T_EndUncertainty − T_BeginUncertainty |
| Verifiable Recent Validity Interval | V | T_BeginUncertainty − T_BeginValid |
| Verifiable Seniority Interval | S | T_BeginUncertainty − T_BeginSeniority |
| Validity Evaluation Interval | $E_V$ | T_EndUncertainty − T_BeginValid |
| Seniority Evaluation Interval | $E_S$ | T_EndUncertainty − T_BeginSeniority |

Figure 4:
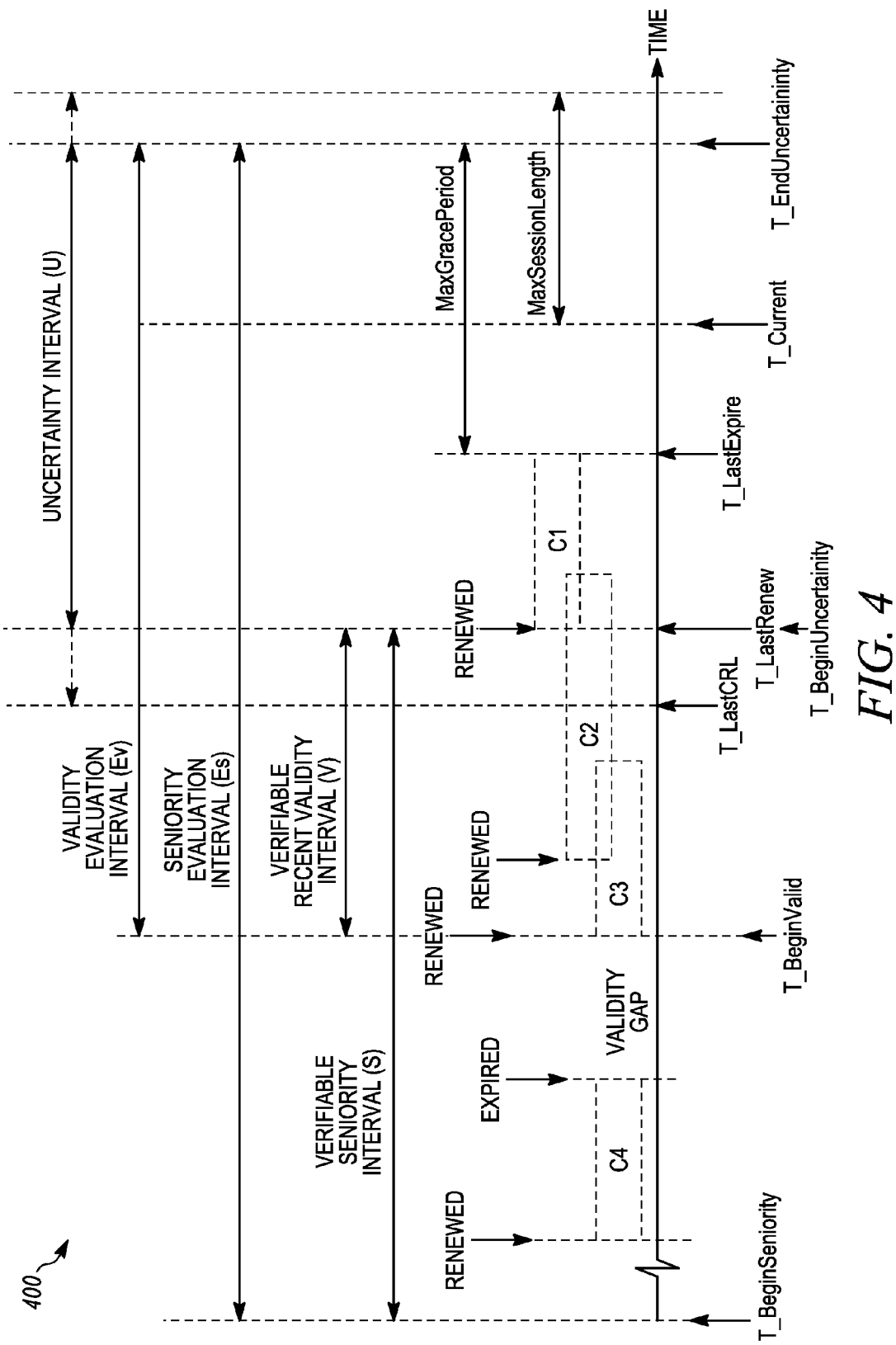
FIG. 4 is timeline illustrating defined variables and intervals in circumstances where a most recent certificate was renewed after a last certificate revocation list (CRL) update was received, and the certificate expired before the current time, according to some embodiments.

Referring to FIG. 4, a timeline 400 illustrates the above defined variables and intervals in circumstances where a most recent certificate was renewed after a last CRL update was received, and the certificate expired before the current time. The rectangles $C_1$ to $C_4$ each indicate the valid lifetime of a certificate.

Figure 5:
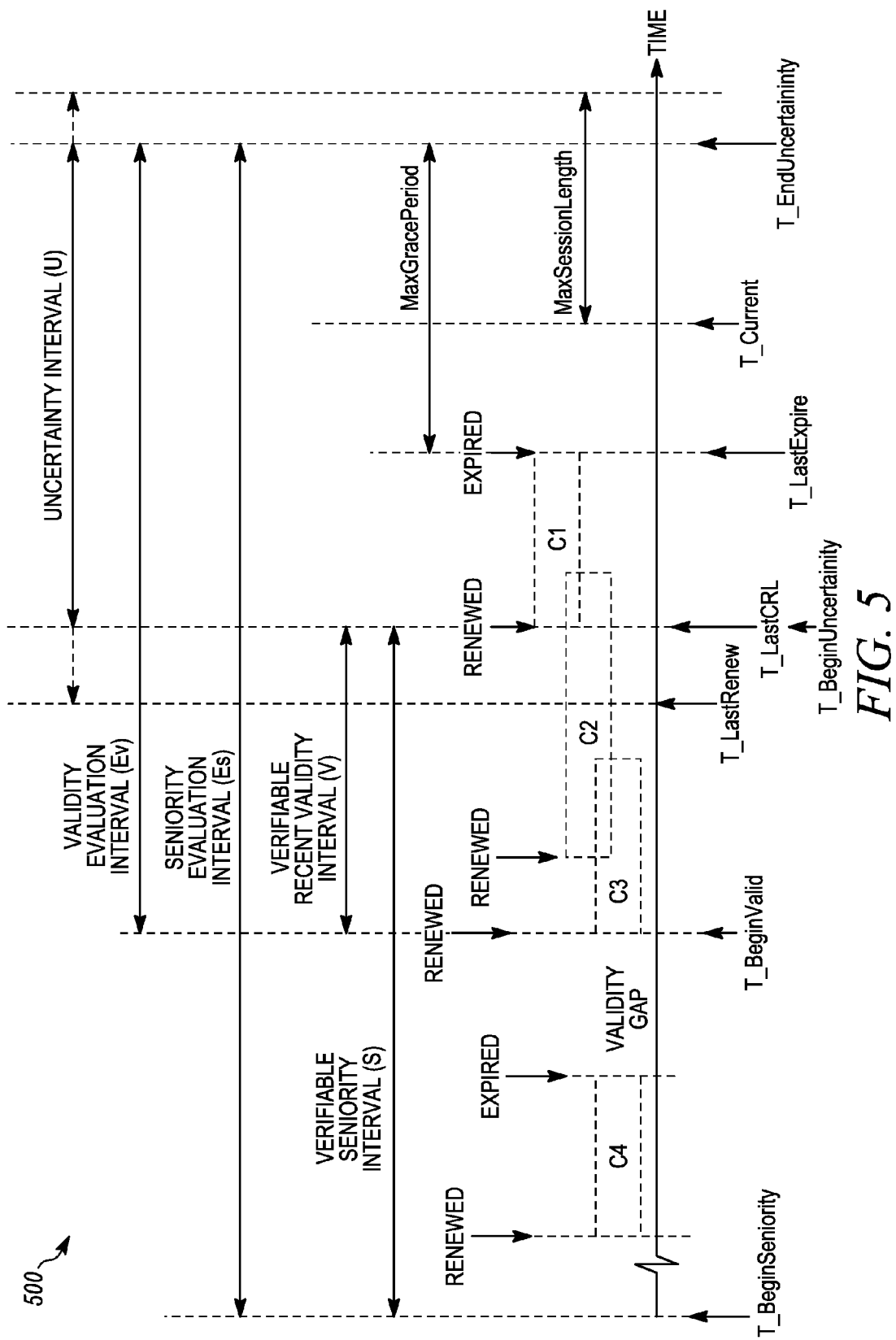
FIG. 5 is a timeline illustrating defined variables and intervals in circumstances where a most recent certificate was renewed before a last CRL update was received, and the certificate expired before the current time, according to some embodiments.

Referring to FIG. 5, a timeline 500 illustrates the above defined variables and intervals in circumstances where a most recent certificate was renewed before a last CRL update was received, and the certificate expired before the current time.

Figure 6:
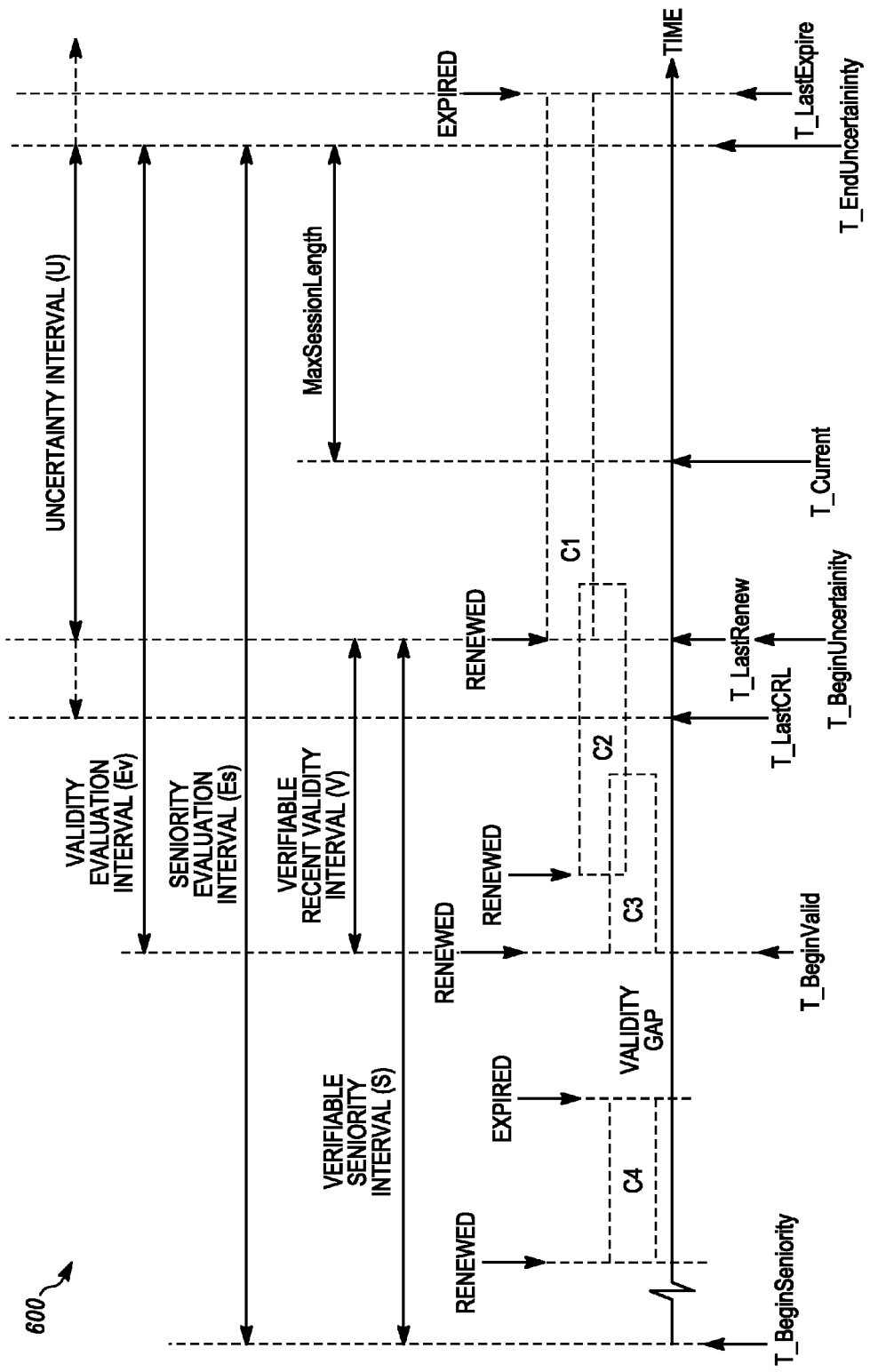
FIG. 6 is a timeline illustrating defined variables and intervals in circumstances where a most recent certificate was renewed after a last CRL update was received, and the certificate expiration date is beyond a permissible session end time, according to some embodiments.

Referring to FIG. 6, a timeline 600 illustrates the above defined variables and intervals in circumstances where a most recent certificate was renewed after a last CRL update was received, and the certificate expiration date is beyond a permissible session end time.

Figure 7:
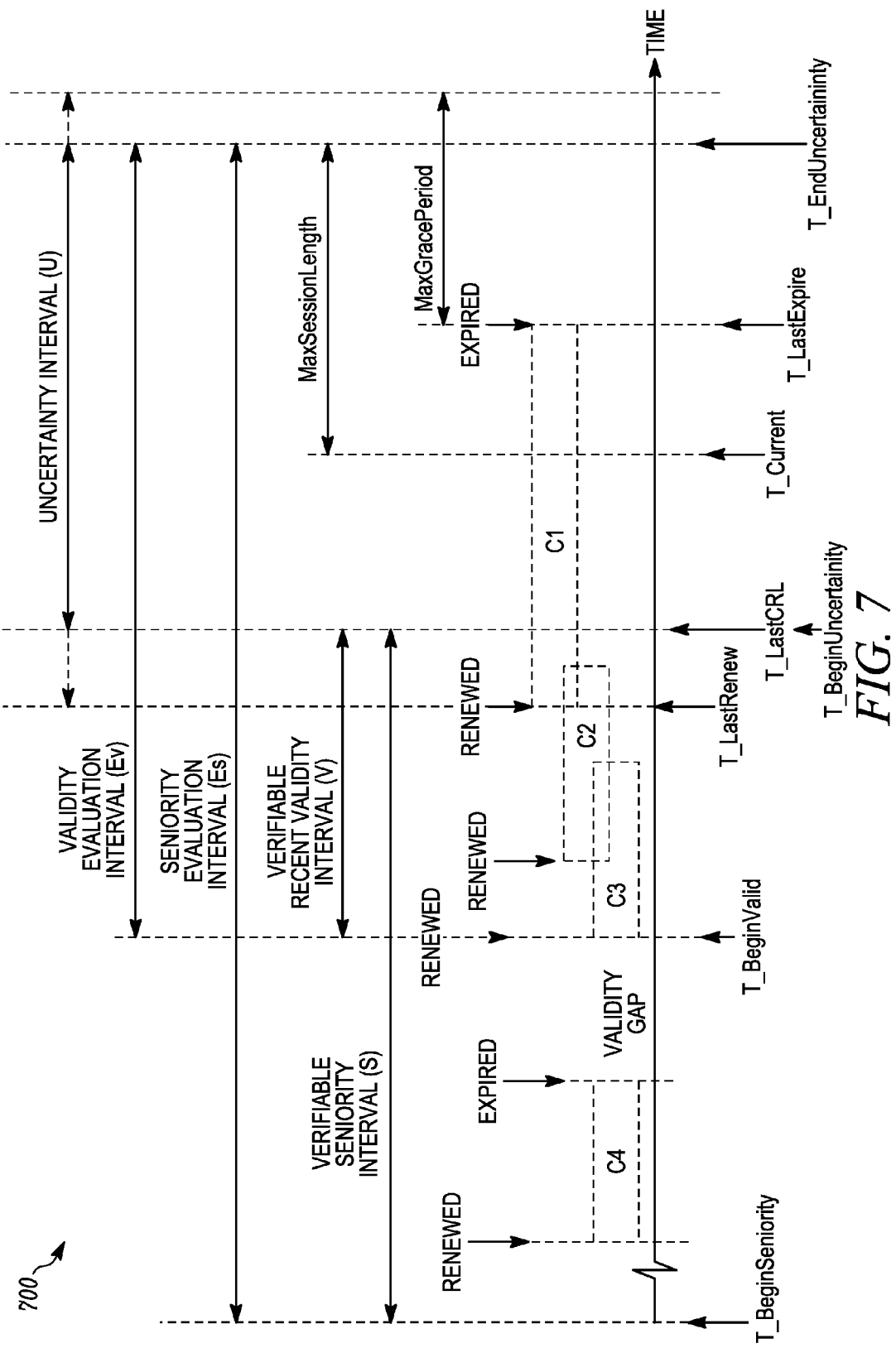
FIG. 7 is a timeline illustrating defined variables and intervals in circumstances where a most recent certificate was renewed before a last CRL update was received, and the certificate has not yet expired, according to some embodiments.

Referring to FIG. 7, a timeline 700 illustrates the above defined variables and intervals in circumstances where a most recent certificate was renewed before a last CRL update was received, and the certificate has not yet expired.

Predetermined personnel attributes associated with a certificate holder can be included in the certificate holder's certificate, such that the attributes can be used by a relying party to further determine the trustworthiness of the certificate holder. For example, such personnel attributes can include the following:

Security Level: A security level of the certificate holder, which may indicate that a predetermined level of background investigation has taken place, and that actual vetting of the certificate holder's trustworthiness has been accomplished. A security level may provide a reliable measure of trustworthiness.

Security Tenure: A length of time a certificate holder is authorized to operate at a given security level, which may be based on a reasonable assumption that the longer the certificate holder has been at a given security level the more trustworthy the certificate holder may be for the authentication required to operate at the given security level.

Total Employment Seniority: This attribute may be based on a reasonable assumption that the longer a certificate holder has worked for an employer the more trustworthy the certificate holder may be.

Rank: This attribute may be based on a reasonable assumption that certificate holders of higher ranks are often more trustworthy and hence given more responsibility.

Trustworthiness Metric: Rather than having to infer a level of trustworthiness from selected attributes, it is also possible for an organization to assign a certificate holder a specific trustworthiness metric, which represents an explicit level of trustworthiness that is pre-approved by the organization.

The above are examples only of the type of attributes that can be used to help a relying party determine the trustworthiness of a certificate holder and hence a TCSA or a grace period that should be allocated to the certificate holder depending on whether the certificate is unexpired or expired. Other attributes, or combinations or subsets of the attributes also can be used within the scope of the present invention. For example, an organization may value Total Employment Seniority more than Rank, and therefore would include Total Employment Seniority in a certificate but leave Rank out. Of course, it would also be possible to create a function of one or more such attributes. The specific attributes used and any functions thereof can be a matter of local policy.

According to some embodiments of the present invention, system attributes associated with a device utilized by a certificate holder are used to implement algorithms of the present invention. For example, a relying party may derive a trustworthiness metric value based on predetermined system attributes of the device used by a certificate holder, wherein said system attributes are verifiable by the relying party through physical contact with the certificate holder.

One example of an implementation of such a trustworthy metric is based on whether the device is equipped with licensed hardware (e.g., a secure storage device for the private key, or a secure device that executes all public key cryptography operations) or licensed software (e.g., special encryption software) that can be verified through physical contact.

Given that a certificate holder is able to demonstrate evidence that its device possesses the needed attributes, the relying party then reserves a right to grant the certificate holder a TCSA or a grace period (depending, respectively, on whether the certificate is unexpired or expired), which are subject to specific conditions on access or task authorization according to a predetermined policy, as well as the maximum TCSA or maximum grace period defined in the certificate.

Further, environmental attributes can be used to implement algorithms of the present invention. In some embodiments, it may be appropriate to consider environmental attributes when deciding whether or not to grant a TCSA or a grace period (depending on whether the certificate is unexpired or expired), and when determining how long such a TCSA or grace period should be. For example, such environmental attributes can include:

Network Status: This may include the accessibility of a certificate status repository.

Detected Alarms: This may include a flag in a wireless local area network (WLAN) or worldwide interoperability for microwave access (WiMax) beacon that indicates an elevated state of alert.

Local Policy Variables: This may include a locally configurable flag that states, for example, that the certificate holder is at an incident scene of unusual proportions or duration.

Using the above environmental attributes, an organization may institute a policy that states, for example, that no grace period will be granted unless both of the following conditions are met: 1) local policy variables at the relying party indicate that the certificate holder is present at an incident, and 2) an authoritative CRL for a responsible agency is not reachable via the network.

As a certificate could have been renewed since T_LastCRL, the starting time for a TCSA is T_BeginUncertainty, which is max(T_LastRenew, T_LastCRL). For a TCSA to be considered valid by a relying party, the ending time for the TCSA is after T_Current but before T_LastExpire. If T_LastExpire is before T_Current, TCSA is not applicable since the certificate has already expired. Further, the ending time for the TCSA must be before (T_BeginUncertainty+MaxOutdate). Thus, provided that the certificate is unexpired (i.e., T_Current<T_LastExpire), a valid TCSA satisfies the following bounds:

$$TCSA \geq T\_Current - T\_BeginUncertainty; \quad \text{Eq. 1}$$

$$TCSA \leq MaxTCSA, \quad \text{Eq. 2}$$

where $$MaxTCSA = \min(MaxOutdate, (T\_LastExpire - T\_BeginUncertainty)). \quad \text{Eq. 3}$$

Otherwise, if the certificate has expired (i.e., T_Current≥T_LastExpire), TCSA is set to 0.

According to some embodiments of the present invention, a TCSA can be determined by a mathematical function of metrics assigned to each of the applicable attributes. For example, a mathematical function for TCSA can be defined as follows:

If T_Current<T_LastExpire, then $$TCSA = (T\_Current - T\_BeginUncertainty) + T(attributes), \quad \text{Eq. 4}$$

else TCSA=0.

T(attributes) conforms to the following bounds:

$$0 \leq T(attributes) \leq MaxTCSA - (T\_Current - T\_BeginUncertainty). \quad \text{Eq. 5}$$

Also, a variable a(attributes) can be defined to be T(attributes) normalized by the upper-bound above, so that $0 \leq \alpha(attributes) \leq 1$. Specifically, $$\alpha(attributes) = T(attributes)/\Delta TCSA, \quad \text{Eq. 6}$$

where $$\Delta TCSA = (MaxTCSA - (T\_Current - T\_BeginUncertainty)) \quad \text{Eq. 7}$$

Then, provided the certificate is unexpired, $$TCSA = (T\_Current - T\_BeginUncertainty) + \alpha(attributes) \times \Delta TCSA. \quad \text{Eq. 8}$$

In one embodiment, a(attributes) can be a minimum of metrics assigned to individual applicable attributes, wherein each metric is a variable bounded between 0 and 1. In another embodiment, α(attributes) can be a product of the metrics.

According to some other embodiments of the present invention, a TCSA can be determined by referring to a table, such as Table 4 below.

TABLE 4

| Personnel Attributes | | System Attributes Secure | Environmental Attributes | Result |
|---|---|---|---|---|
| Tenure | Rank | Hardware? | Network Status | TCSA |
| * | * | * | PA Reachable | min(MaxTCSA, 20 Minutes) |

TABLE 4-continued

| Personnel Attributes | | System Attributes Secure | Environmental Attributes | Result |
|---|---|---|---|---|
| Tenure | Rank | Hardware? | Network Status | TCSA |
| ≦1 Year | Lower than or equal to rank of Captain | No | PA Unreachable | min(MaxTCSA, 1 Hour) |
| ≦1 Year | Higher than rank of Captain | No | PA Unreachable | min(MaxTCSA, 1 Day) |
| >1 Year | Lower than or equal to rank of Captain | No | PA Unreachable | min(MaxTCSA, 1 Day) |
| >1 Year | Higher than rank of Captain | No | PA Unreachable | min(MaxTCSA, 5 Days) |
| ≦1 Year | Lower than or equal to rank of Captain | Yes | PA Unreachable | min(MaxTCSA, 2 Hours) |
| ≦1 Year | Higher than rank of Captain | Yes | PA Unreachable | min(MaxTCSA, 2 Days) |
| >1 Year | Lower than or equal to rank of Captain | Yes | PA Unreachable | min(MaxTCSA, 2 Days) |
| >1 Year | Higher than rank of Captain | Yes | PA Unreachable | min(MaxTCSA, 10 Days) |

In general, a TCSA can be a function of personnel attributes, system attributes, environmental attributes, MaxOutdate, as well as any other aforementioned variables or an equivalent.

Also, according to some embodiments of the present invention, a certificate grace period (CGP) begins at T_LastExpire, and ends no later than (T_LastExpire+MaxGracePeriod). Further, it is desirable that the CGP ends no later than (T_Current+MaxSessionLength). Hence, the CGP will end no later than T_EndUncertainty, which is a minimum of (T_LastExpire+MaxGracePeriod) and (T_Current+MaxSessionLength). If (T_EndUncertainty−T_LastExpire) 0, then the CGP is bounded by (T_EndUncertainty−T_LastExpire). However, if (T_EndUncertainty−T_LastExpire)<0 (e.g., as shown in FIG. 3), then the CGP is set to 0 since the certificate will remain unexpired throughout the period of MaxSesionLength. Hence, the CGP satisfies the following bounds:

$$0 \leq CGP \leq \max(T\_EndUncertainty - T\_LastExpire, 0) \quad \text{Eq. 9}$$

According to some embodiments of the present invention, a CGP is determined based on a trustworthiness metric, $\beta(*)$, whose value is bounded between 0 and 1. Specifically, the CGP conforms to the following equations.

$$X = \beta(*) \times MaxGracePeriod; \quad \text{Eq. 10}$$

$$Y = \max(T\_EndUncertainty - T\_LastExpire, 0); \quad \text{Eq. 11}$$

$$CGP = \min(X, Y). \quad \text{Eq. 12}$$

One example of an implementation of a trustworthiness metric is based on the Verifiable Recent Validity Interval. Given that a certificate holder is able to demonstrate evidence that it has been trustworthy over a continuous interval, the relying party reserves a right to grant the certificate holder a grace period, which is subject to specific conditions on access or task authorization according to a predetermined policy. Specifically, a trustworthiness metric called a Normalized Verifiable Recent Validity Interval (V*) is defined as the Verifiable Recent Validity Interval, normalized by a Validity Evaluation Interval, as defined in the following equation:

$$V^* = \frac{V}{E_V} = \frac{V}{V+U} \quad \text{Eq. 13}$$

Therefore, V* takes a value between 0 and 1. The certificate grace period granted by the relying party is a non-decreasing function of V*, upper-bounded by the maximum grace period as defined in the certificate. In particular, the trustworthiness metric is a function of V and U, and a certificate grace period can be derived from Eq. 10, Eq. 11, and Eq. 12, by setting the trustworthiness metric $\beta(*)$ to V*.

Another example of an implementation of a trustworthiness metric is based on the Verifiable Seniority Interval. Given that a certificate holder is able to demonstrate evidence that it has a verifiable history of receiving certificates from the same CA without having been involuntarily revoked, the relying party reserves a right to grant the certificate holder a grace period, which is subject to specific conditions on access or task authorization according to a predetermined policy. Specifically, a trustworthy metric called a Normalized Verifiable Seniority Interval (S*) is defined as the Verifiable Seniority Interval, normalized by a Seniority Evaluation Interval, as defined in the following equation:

$$S^* = \frac{S}{E_S} = \frac{S}{S+U} \quad \text{Eq. 14}$$

Therefore, S* takes a value between 0 and 1. The certificate grace period granted by the relying party is a non-decreasing function of S*, upper-bounded by the maximum grace period as defined in the certificate. In particular, the trustworthiness metric is a function of S and U, and a certificate grace period can be derived from Eq. 10, Eq. 11, and Eq. 12, by setting the trustworthiness metric $\beta(*)$ to S*.

According to some other embodiments of the present invention, a trustworthiness metric, and hence a CGP, can be determined as a function of personnel attributes, system attributes, and environmental attributes. For example a trustworthiness metric can be determined by referring to a table, such as Table 5 below.

TABLE 5

| Personnel Attributes | | System Attributes Secure | Environmental Attributes | Result Trustworthiness |
|---|---|---|---|---|
| Tenure | Rank | Hardware? | Network Status | Metric |
| * | * | * | PA Reachable | 0.05 |
| ≦1 Year | Lower than or equal to rank of Captain | No | PA Unreachable | 0.10 |
| ≦1 Year | Higher than rank of Captain | No | PA Unreachable | 0.25 |
| >1 Year | Lower than or equal to rank of Captain | No | PA Unreachable | 0.25 |
| >1 Year | Higher than rank of Captain | No | PA Unreachable | 0.75 |
| ≦1 Year | Lower than or equal to rank of Captain | Yes | PA Unreachable | 0.20 |
| ≦1 Year | Higher than rank of Captain | Yes | PA Unreachable | 0.50 |
| >1 Year | Lower than or equal to rank of Captain | Yes | PA Unreachable | 0.50 |
| >1 Year | Higher than rank of Captain | Yes | PA Unreachable | 1.00 |

In general, the certificate grace period is a function of V, S, U, and MaxGracePeriod, as well as any other aforementioned variables and attributes.

According to some embodiments of the present invention, implicit negotiation is used, wherein negotiation between a certificate holder and a relying party is implied when the certificate holder presents to the relying party an unverifiable certificate. In this respect, the relying party will assume that negotiation is in order by default. For example, further to a need for requesting access to a relying party's resources while a service of a CA is unavailable, a certificate holder may present its PKI certificate, which includes predetermined certificate attributes, to the relying party. After receiving the PKI certificate, knowing that the CA service is unavailable, the relying party determines an appropriate TCSA or grace period for the certificate holder based on the predetermined certificate attributes and whether the certificate has expired.

For determination of a certificate grace period, explicit negotiation can alternatively be used, wherein a negotiation handshake between a certificate holder and a relying party is required prior to an authentication request from the certificate holder to the relying party. In this respect, the relying party will assume that negotiation is only executed on demand. For example, further to a need for requesting access to a relying party's resources while a service of a CA is unavailable, a certificate holder may initiate a trust negotiation handshake with the relying party. The handshake contains steps for the certificate holder to provide to the relying party evidence or attributes required to negotiate an extension of the certificate holder's grace period, depending on whether the certificate has expired. After a grace period is determined (depending on whether the certificate is unexpired or expired), a normal certificate based authentication process is started between the certificate holder and the relying party, without the need of a CA service in certificate verification.

Figure 8:
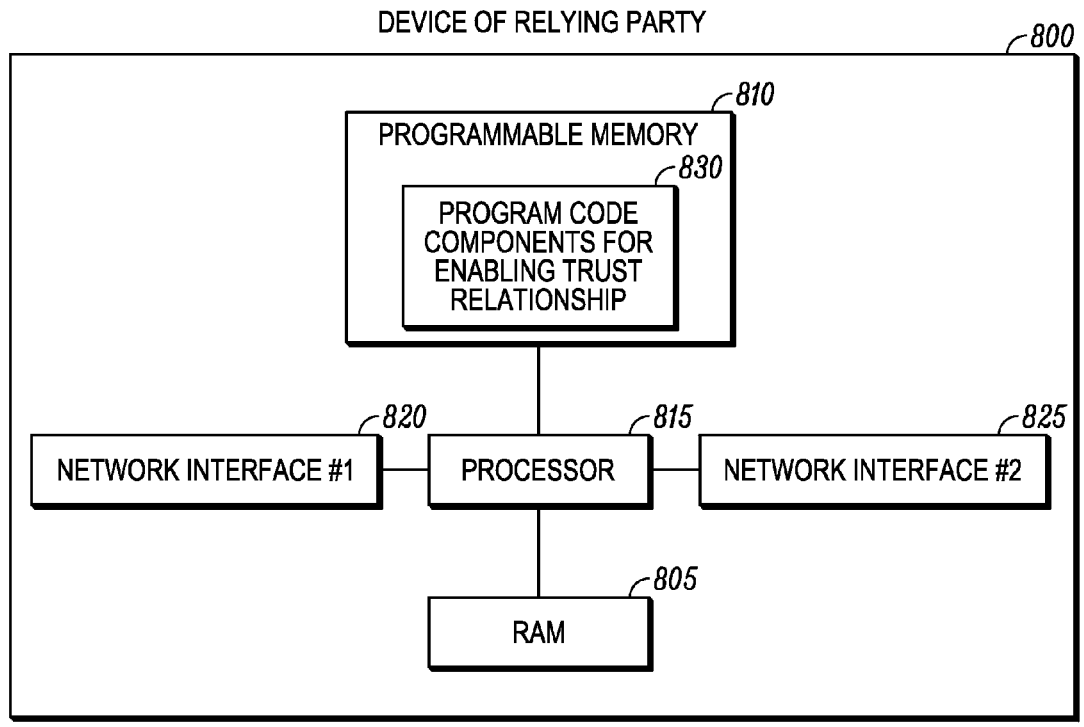
FIG. 8 is a block diagram illustrating components of a device that functions as a relying party in a PKI communication network, according to some embodiments.

Referring to FIG. 8, a block diagram illustrates components of a device 800 that functions as a relying party in a PKI communication network, according to some embodiments of the present invention. The device 800, for example, can be an integrated unit such as a computer, mobile telephone, or personal digital assistant (PDA) containing at least all the elements depicted in FIG. 8, as well as any other elements necessary for the device 800 to perform its particular functions. Alternatively, the device 800 can comprise a collection of appropriately interconnected units or devices, wherein such units or devices perform functions that are equivalent to the functions performed by the elements depicted in FIG. 8.

The device 800 comprises a random access memory (RAM) 805 and a programmable memory 810 that are coupled to a processor 815. The processor 815 also has ports for coupling to network interfaces 820, 825. The network interfaces 820, 825, which for example may be wireless network interfaces, can be used to enable the device 800 to communicate with other node devices in a communication network.

The programmable memory 810 can store operating code (OC) for the processor 815 and code for performing functions associated with a network device. For example, the programmable memory 810 can store computer readable program code components 830 configured to cause execution of a method for enabling a trust relationship using an expired PKI certificate, as described herein.

Figure 9:
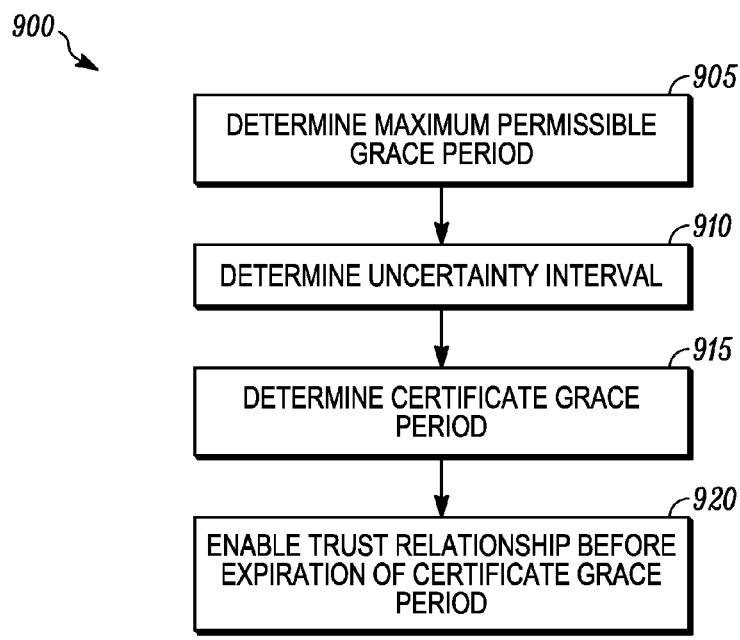
FIG. 9 is a general flow diagram illustrating a method that enables a trust relationship using an unexpired PKI certificate where a current status of the PKI certificate is unavailable, according to some embodiments.

Referring to FIG. 9, a general flow diagram illustrates a method 900 for enabling a trust relationship using an expired PKI certificate, according to some embodiments of the present invention. First, at step 905, a maximum permissible grace period during which the PKI certificate can be conditionally granted a valid status is determined at a relying party. For example, the device 800 functioning as a relying party in a PKI communication network determines a maximum permissible grace period by reading a MaxGracePeriod variable included in a PKI certificate received from a certificate holder.

Next, at step 910, an uncertainty interval during which the relying party is unable to detect a revocation of the PKI certificate is determined at the relying party. For example, the device 800 calculates the uncertainty interval by subtracting the variable T_BeginUncertainty from the variable T_EndUncertainty.

At step 915, a certificate grace period is determined at the relying party from a function of the maximum permissible grace period (MaxGracePeriod), the uncertainty interval and at least one attribute defined in the PKI certificate. For example, the device 800 calculates the certificate grace period as min(X, Y) as defined above in Equation 12.

At step 920, using the PKI certificate, a trust relationship is enabled between the relying party and a certificate holder of the PKI certificate after determining the grace period and before an expiration of the grace period. For example, as shown in FIG. 4, 5 or 7, the device 800 enables a trust relationship for a duration of a certificate grace period that starts at time T_LastExpire and that is no longer than the duration of the variable MaxGracePeriod.

Advantages of some embodiments of the present invention therefore include enabling a relying party to continue to use an expired PKI certificate when connectivity to a corresponding certificate authority (CA) is unavailable. A balance thus can be made between strict enforcement of a certificate validation, which could have a negative impact on the availability of a PKI, and arbitrary allowance of a grace period, which could compromise network security.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling a trust relationship using an expired public key infrastructure (PKI) certificate, the method comprising:
   determining at a relying party device a maximum permissible grace period during which the PKI certificate can be conditionally granted a valid status;
   determining at the relying party device an uncertainty interval during which the relying party device is unable to detect a revocation of the PKI certificate;
   determining at the relying party device a certificate grace period from a function of the maximum permissible grace period, the uncertainty interval and at least one attribute defined in the PKI certificate; and
   enabling, using the PKI certificate, a trust relationship between the relying party device and a certificate holder device presenting the PKI certificate after determining the grace period and before an expiration of the grace period.

2. The method of claim 1, wherein the certificate grace period is determined from a function of an uncertainty interval and a verifiable recent validity interval.

3. The method of claim 1, wherein the certificate grace period is determined from a function of an uncertainty interval and a verifiable seniority interval.

4. The method of claim 2, wherein the verifiable recent validity interval is normalized by a validity evaluation interval.

5. The method of claim 3, wherein the verifiable seniority interval is normalized by a seniority evaluation interval.

6. The method of claim 1, wherein the method is defined by an online certificate status protocol (OCSP).

7. The method of claim 1, wherein a maximum period for the certificate grace period is defined as a variable included in the PKI certificate.

8. The method of claim 1, wherein the certificate grace period is determined during an implicit negotiation with the certificate holder.

9. The method of claim 1, wherein the certificate grace period is determined during an explicit negotiation with the certificate holder.

10. A device for enabling a trust relationship using an expired public key infrastructure (PKI) certificate, comprising:
 a processor; and
 a programmable memory coupled to the processor for storing:
  computer readable program code components for determining at a relying party device a maximum permissible grace period during which the PKI certificate could be conditionally granted a valid status;
  computer readable program code components for determining at the relying party device an uncertainty interval during which the relying party device is unable to detect a revocation of the PKI certificate;
  computer readable program code components for determining at the relying party device a certificate grace period from a function of the maximum permissible grace period, the uncertainty interval and at least one attribute defined in the PKI certificate; and
  computer readable program code components for enabling, using the PKI certificate, a trust relationship between the relying party device and a certificate holder device presenting the PKI certificate after determining the grace period and before an expiration of the grace period.

11. The device of claim 10, wherein the certificate grace period is determined from a function of an uncertainty interval and a verifiable recent validity interval.

12. The device of claim 10, wherein the certificate grace period is determined from a function of an uncertainty interval and a verifiable seniority interval.

13. The device of claim 11, wherein the verifiable recent validity interval is normalized by a validity evaluation interval.

14. The device of claim 12, wherein the verifiable seniority interval is normalized by a seniority evaluation interval.

15. The device of claim 10, wherein enabling the trust relationship is performed during execution of an online certificate status protocol (OCSP).

16. The device of claim 10, wherein a maximum period for the certificate grace period is defined as a variable included in the PKI certificate.

17. The device of claim 10, wherein the certificate grace period is determined during an implicit negotiation with the certificate holder.

18. The device of claim 10, wherein the certificate grace period is determined during an explicit negotiation with the certificate holder.

19. A device for enabling a trust relationship using an expired public key infrastructure (PKI) certificate, comprising:
 means for determining at a relying party device a maximum permissible grace period during which the PKI certificate could be conditionally granted a valid status;
 means for determining at the relying party device an uncertainty interval during which the relying party device is unable to detect a revocation of the PKI certificate;
 means for determining at the relying party device a certificate grace period from a function of the maximum permissible grace period, the uncertainty interval and at least one attribute defined in the PKI certificate; and
 means for enabling, using the PKI certificate, a trust relationship between the relying party device and a certificate holder device presenting the PKI certificate after determining the grace period and before an expiration of the grace period.

* * * * *